United States Patent Office 3,248,347
Patented Apr. 26, 1966

3,248,347
REACTION PRODUCT OF STANNOUS CHLORIDE AND ALKYLENE OXIDE AS CATALYSTS FOR POLYMERIZATION OF ALKYLENE OXIDES
Arthur E. Gurgiolo and Claude A. Latta, Jr., Lake Jackson, Tex., assignors to The Dow Chemical Company, Midland, Mich., a corporation of Delaware
No Drawing. Filed June 13, 1961, Ser. No. 116,704
16 Claims. (Cl. 260—2)

This invention pertains to new organo-tin compositions, methods of making these compositions and methods of polymerizing alkylene oxides by use of these compositions as catalysts.

The compositions of the invention are formed by the addition of an alkylene oxide to stannous chloride.

Ferric chloride is known to react with an alkylene oxide to produce a product that is an effective catalyst for the polymerization of alkylene oxides (see, for instance, Pruitt and Baggett, U.S. Patent 2,706,181). It is also known that the catalyst of Pruitt and Baggett is improved by a treatment with water which is thought to be a partial hydrolysis (see Borkovec, U.S. Patent 2,873,258). We have found, however, that when other metal halides are substituted for the ferric chloride used by the above patentees, either no catalytic action is obtained or the polymer made with such catalyst is of low molecular weight and is inferior to that obtainable with the ferric chloride catalyst. Thus, $MnCl_2$, $CoCl_2$, $NiCl_2$, $CdCl_2$, $MgCl_2$, $MoCl_5$, and $WCl_2$ were found to be substantially unreactive. On the other hand, $AlCl_3$, $SnCl_4$, $TiCl_4$, $ZnCl_2$, $AsCl_3$ and $SbCl_3$ reacted vigorously with propylene oxide but produced only liquid polymers of low molecular weight.

Stannous salts of certain organic carboxylic acids are known to be effective catalysts for the polymerization of alkylene oxides (see Gurgiolo, U.S. Patent 2,933,459). As pointed out above, however, inorganic tin salts, such as stannic chloride, while highly reactive, have not been found useful for the production of alkylene oxide polymers of high molecular weight.

According to the present invention, alkylene oxides are readily polymerized to form solid polymers of very high molecular weight by the use of a new catalyst which is made by the reaction of an alkylene oxide with stannous chloride.

The term "alkylene oxide" as used herein includes not only the unsubstituted alkylene oxides, such as for example, ethylene oxide, 1,2-propylene oxide, 1,2- and 2,3-butylene oxides and the higher vicinal alkylene oxides, but also such oxides wherein the alkylene radical bears an inert substituent, such as for example, a halogen, phenyl, alkoxy, alkenoxy or phenoxy radical. Thus the term includes styrene oxide (phenylethylene oxide), epichlorohydrin (3-chloro-1,2-propylene oxide) and alkyl, alkenyl and phenyl glycidyl ethers (3-alkoxy-, 3-alkenoxy- and 3-phenoxy-1,2-propylene oxide, respectively) and the like, and mixtures thereof.

The new catalysts are condensates of stannous chloride with an alkylene oxide. Ordinarily, the new catalysts are made in an inert, non-aqueous solvent and thereafter isolated as white, powdery solids which are insoluble in propylene oxide. The preferred catalysts are made by adding either propylene oxide, epichlorohydrin, or styrene oxide very gradually with agitation to a body of stannous chloride which is either anhydrous or the dihydrate ($SnCl_2 \cdot 2H_2O$). The temperature during condensation is suitably maintained between 0° C. and about 50° C., preferably below 30° C., by supplying cooling and by limiting the rate of adding oxide to avoid overheating. An excess of oxide is added to insure complete reaction of the stannous chloride.

To insure good temperature control during formation of the complex condensate, the condensation is preferably carried out in the presence of an inert non-aqueous diluent. The medium may either be a solvent for the $SnCl_2$ or may be a non-solvent suspending medium. Carbon tetrachloride is the preferred diluent both because of its excellent suspending power with regard to $SnCl_2$ and because it tends to limit temperature rise by boiling if excessive evolution of heat occurs. However, methanol, ethyl acetate, and diethyl ether, among others, may be used as diluents. Among the non-solvent media, low-boiling liquid aliphatic hydrocarbons are most satisfactory, e.g. n-hexane. For ease of operation; solvent media are preferred over non-solvent because of the rather sticky character of the $SnCl_2$ suspensions in non-solvents.

The proportion of solvent or non-solvent is not critical and may range from zero up to 10 or more parts by weight per part of $SnCl_2$. With $CCl_4$, a ratio of about 8 parts of solvent per part of the $SnCl_2$ is quite satisfactory.

The condensate products may be used for catalysts as initially produced but it has been found that their catalytic effect is improved by hydrolyzing them, suitably while still in the solvent, and isolating them as a fine white powder. The hydrolysis is best carried out by the addition of about 0.1 to 2 moles of water, and preferably 1 mole of water, per mole of $SnCl_2$ in the complex condensation product.

In making high polymers of alkylene oxides, such as for example, solid propylene oxide and styrene oxide polymers by use of the complex catalysts of the invention, the monomer and catalyst may simply be charged together into a closed vessel and heated until polymerization is complete. The mixture is advantageously agitated during polymerization. The proportion of catalyst used is small, being satisfactorily from 1 to 5% by weight of the oxide to be polymerized and preferably 2 to 4%. Polymerization temperature suitably is in the range of 60 to 100° C. with 80 to 100° C. being preferred and 80° C. about the optimum. Within the 80 to 100° C. temperature range, the polymerization time may vary from 50 hours to 100 hours or more to insure substantial completion of the reaction. Complete reaction is not essential however, since unreacted oxide may be recovered.

The crude product resulting from the polymerization process contains, in addition to the desired solid resin of high molecular weight, whatever liquid or low polymers may have formed, residual oxide monomer, and catalyst residue. This crude material is suitably first warmed, if necessary, to vaporize off the unreacted monomer. The resulting product, a tough rubbery mass of white color, is treated in any convenient way to remove the tin-containing catalysts residue and to separate the desired solid resin from any liquid polymer that may be present. Preferably, the rubbery mass is dissolved in several volumes of solvent, e.g., hot acetone, and the solution acidified, as with hydrochloric acid, to convert the tin-containing catalyst to soluble tin salts. The resulting clear yellow solution is then cooled to a temperature sufficiently low to cause the solid polymer to crystallize out of solution. The crystalline material may then be further purified by recrystallization from acetone, yielding white solid polymer having a molecular weight sufficiently high that its softening point is over 50° C.

Example 1

Into a one-liter reaction flask, equipped with a means for stirring and temperature control, were placed 48 g. (.25 mole) of $SnCl_2$ suspended in 250 ml. of $CCl_4$. The temperature was maintained at 35° C. while 44 g. (.75 mole) of propylene oxide were added dropwise over a period of 30 minutes. Upon completion of the propylene oxide addition, the temperature was raised to 40° C. and the reaction mixture was digested for one hour. At the end of the digestion period, 250 ml. of normal hexane were added, the temperature was raised to 45° C., and a mixture of 4.5 g. of water and 100 ml. of propylene oxide was added dropwise over a 30-minute period. This mixture was then digested at 45° C. for 30 minutes, cooled to 25° C., and filtered. The product, obtained by washing the residue three times with propylene oxide, was a fine white powder.

| Catalyst (48 g.) | Percent |
| --- | --- |
| Sn | 63.0 |
| Total chloride | 7.4 |
| Inorganic chloride | 2.1 |

*Example 2*

Into a one-liter reaction flask, equipped with a means for stirring and temperature control, were placed 96 g. (.5 mole) of $SnCl_2$. The temperature was maintained below 25° C. while 260 g. (4.5 moles) of propylene oxide were added dropwise over a period of one hour. At the end of the one-hour period, a mixture of 9 g. of water dissolved in 50 ml. of propylene oxide was added over a 5-minute period while the catalyst solution was rapidly stirred and the temperature was held at 25° C. The fine white powder which formed was filtered off, washed 3 times with propylene oxide, and vacuum dried.

| Catalyst (90 g.) | Percent |
| --- | --- |
| Sn | 55.0 |
| Total chloride | 5.8 |
| Inorganic chloride | 0.7 |

*Example 3*

Into a one-liter reaction flask, equipped with a means for stirring and temperature control, were placed 48 g. (.25 mole) of $SnCl_2$ slurried in 25 ml. of n-hexane. The temperature was maintained at 30° C. while 90 g. (.75 mole) of styrene oxide were added dropwise over a period of 50 minutes. Upon completion of the styrene oxide addition, 100 ml. of n-hexane were added and the reaction mixture was digested for 1.5 hours at 30° C. At the end of this period, the reaction mixture was heated to 50° C., maintained thereat for 30 minutes, cooled to 35° C. and a mixture of 4.5 g. of water in 50 ml. of propylene oxide was added dropwise over a 20-minute period. The solid product was filtered from the reaction mixture, washed three times with propylene oxide and vacuum dried:

| Catalyst (48 g.) | Percent |
| --- | --- |
| Sn | 56.0 |
| Total chloride | 5.6 |
| Inorganic chloride | 3.3 |

*Example 4*

Into a one-liter reaction flask, equipped with a means for stirring and temperature control, were placed 95 g. (.5 mole) of $SnCl_2$ suspended in 200 ml. $CCl_4$. The temperature was maintained in the range of 29 to 36° C. while 90 g. (.75 mole) of styrene oxide were added dropwise over a 75-minute period. Upon completion of the styrene oxide addition, the reaction mixture was digested at 45° C. for 1.5 hours. At the end of the digestion period, a mixture of 4.5 g. of water in 30 ml. of dioxane was added dropwise over a 30-minute period while the temperature was maintained at 46° C. This was followed by a 2-hour digestion at 45° C., cooling to 25° C., filtering, washing with propylene oxide and vacuum drying in order to get the white powdery complex catalyst.

| Catalyst (62 g.) | Percent |
| --- | --- |
| Sn | 46.0 |
| Total chloride | 8.6 |
| Inorganic chloride | 8.1 |

*Example 5*

Into a one-liter reaction vessel, equipped with a means for stirring and temperature control, were placed 57 g. (.25 mole) of $SnCl_2 \cdot 2H_2O$ suspended in 250 ml. of $CCl_4$. The temperature was maintained at less than 35° C. while 90 g. (.75 mole) of styrene oxide were added dropwise over a 30-minute period. At the end of this period, the mixture was heated to 75° C., maintained thereat for 4 hours; cooled to 25°, and filtered. The product was a fine white powder which was washed 3 times with propylene oxide and vacuum dried.

| Catalyst (47 g.) | Percent |
| --- | --- |
| Sn | 59.0 |
| Total chloride | 9.3 |
| Inorganic chloride | 8.3 |

*Example 6*

Into a reaction vessel equipped with a means for stirring and temperature control were placed 200 ml. of carbon tetrachloride and 48 g. of anhydrous stannous chloride. The temperature was maintained at 30° C., while 90 g. of styrene oxide was added portion-wise. Upon completion of the addition, the mixture was digested 30 minutes. The suspended white product (desired catalyst) was partially hydrolyzed by maintaining the temperature of the suspension at 30° C. while adding 4.9 g. of water dissolved in 50 ml. of propylene oxide. After digesting the mixture for 30 minutes, the product was filtered, washed with propylene oxide, and dried. Recovered product was 38 g.

*Example 7*

A catalyst was prepared as in Example 6 with the exception that it was treated with 4.5 g. of water which was not dissolved in propylene oxide. The product was washed with carbon tetrachloride and dried.

*Example 8*

A catalyst prepared according to Example 2 was placed in a 500-ml. citrate bottle in a concentration of 4% by weight (total charge, 100 g.) with propylene oxide. The bottle was capped and polymerization was carried out at 80° C. for 72 hours. There were obtained 58 g. of white rubber-like solid polymer of which 26 g. were dissolved in hot acetone and treated with sufficient hydrochloric acid to convert the tin complex to soluble stannous chloride. The solution was cooled to −10° C., whereupon a solid polymer crystallized and was separated by filtering. Upon vacuum drying, 7.5 g. of white, fluffy, water-resistant solid was obtained which was molded and made into films. The films were oriented and had a yield strength of 7500 p.s.i. The yield of polymer was 58 g.

*Example 9*

A catalyst prepared according to Example 3 was placed in a 500-ml. citrate bottle in a concentration of 4% by weight (total charge, 100 g.) with propylene oxide. The bottle was capped and polymerization was carried out at 80° C. for 48 hours. There were obtained 48 g. of white rubber-like solid polymer of which 26 g. were dissolved in hot acetone and treated with sufficient hydrochloric acid to convert the tin complex to soluble stannous chloride. The solution was cooled to −10° C. whereupon a solid polymer crystallized and was separated by filtering. Upon vacuum drying, 7.0 g. of white, fluffy, water-resistant solid was obtained which could be molded and made into films. The yield of polymer was 48 g.

*Example 10*

A citrate bottle was charged with 100 g. of propylene oxide and 4 g. of the catalyst prepared in Example 6 and capped. A constant-temperature oil bath was rigged in such a manner that a wire cage could be revolved therein. The capped bottle was placed in the cage and revolved while the temperature was maintained at 80°

C. After 48 hours, a rubbery, waxy, milk-white solid was obtained. The conversion was 61%.

Twenty-five g. of the crude polymer were dissolved in 250 ml. of acetone to produce a milky-white, viscous solution and 5 ml. of concentraated HCl was added to dissolve the tin complex catalyst. Upon addition of the HCl, the solution became clear and colorless. On chilling to −20° C. the solution gelled due to precipitated polymer and the solid polymer was removed by filtration, washed with cold acetone, and dried. A 30% yield of isotactic polymer was thus obtained which was readily molded into a strong film.

The acetone filtrate was poured into 2 gallons of water and a fibrous sticky solid separated leaving a milky suspension of low molecular weight polymer in the water. The precipitated polymer was filtered, water washed and dried. A 30% yield of a putty like, tacky polymer was thus obtained.

Example 11

According to the procedure of Example 10, 100 g. of epichlorohydrin was polymerized with the aid of 2.4 g. of the catalyst produced as in Example 6. In 48 hours a viscous syrup was produced. In 144 hours a waxy, tacky solid was produced. The conversion was 75%.

Twenty-five g. of the crude polymer were dissolved in 200 ml. of dioxane-water and treated with 5 ml. of concentrated HCl, after which the solution was poured into 1 liter of methanol. A white, fibrous solid precipitated which was washed with methanol and dried. A 17.6% yield of film-forming polymer was thus obtained.

The filtrate was poured into 2 gallons of water and the precipitated polymer was filtered, water-washed and dried. A 44% yield was thus obtained.

Example 12

Into a rotatable steam autoclave type reaction vessel which could be maintained at 140° C. were placed 100 g. of epichlorohydrin and 4 g. of the catalyst produced as in Example 7. In 24 hours, a solid gelatinous polymer resulted which was vacuum dried. Conversion was 80%. Treatment by dissolving and adding HCl gave only a small amount of isotactic polymer and subsequent treatment with water and filtering gave a yield of 75% atactic polymer. The product was a yellow tacky solid.

Example 13

According to the procedure of Example 12, 100 g. of phenyl glycidyl ether were polymerized with the aid of 4 g. of the catalyst prepared according to Example 7. The conversion was 100% in 24 hours. Hot acetone extraction was applied to 25 g. of the crude product plus the addition of 5 ml. of concentrated HCl. Upon filtering, washing, and drying, a white powder was obtained. The filtrate was poured into 2 liters of water and after 48 hours, the polymer settled out. Upon decantation, filtering, and drying, a tacky solid was obtained which molded at 400° F. to a brittle film.

Another portion 25 g., was extracted with 200 ml. of dioxane at 80° C. Considerable polymer was insoluble. Treatment with 5 ml. of concentrated HCl and standing for 2 hours produced both liquid and solid polymer. The solid polymer was filtered, washed with dioxane and dried. This material molded at 350° F. to a strong flexible film. Softening point was 150° C.

The filtrate was poured into methanol to precipitate the low molecular weight polymer. A white polymer was obtained in a 14% yield which molded to a clear, colorless, tacky film.

Example 14

According to the procedure of Example 12, 100 g. of allyl glycidyl ether were polymerized with the aid of 4 g. of the catalyst prepared according to Example 7. The temperature of polymerization was 80° C. with a time of 120 hours. A conversion of 28% was obtained.

Example 15

According to the procedure of Example 12, 100 g. of beta-chloroethyl glycidyl ether were polymerized with the aid of 4 g. of the catalyst prepared according to Example 7. The temperature of polymerization was 80° C. with a time of 120 hours. A conversion of 25% was obtained.

Example 16

According to the procedure of Example 12, 100 g. of styrene oxide were polymerized with the aid of 4 g. of the catalyst prepared according to Example 7. The temperature of polymerization was 80° C. with a time of 168 hours. A conversion of 100% was obtained.

As is evident from the above examples, the alkylene oxide used in making the catalyst need not be the same as that which is to be polymerized by use of the catalyst. As a matter of fact, we prefer to use an unsubstituted lower alkylene oxide, such as for example, propylene oxide, to make the catalyst, regardless of which oxide is to be later polymerized by use of the catalyst.

In making the new catalysts, the amount of alkylene oxide that is condensed with the stannous chloride is not critical so long as at least about 0.5 mole, and preferably, at least about 1 mole of oxide per mole of stannous chloride is used. If large amounts of oxide are used, the excess oxide is gradually polymerized. Because the reaction which produces the catalyst is vigorous and highly exothermic, while the polymerization is much slower, it is convenient to add oxide to the stannous chloride until the violence of the reaction is abated, usually when 0.5 to 2 moles of oxide per mole of stannous chloride has been used, and separate the catalyst from any unreacted oxide. As a matter of convenience, as much as 10 moles of oxide may be used to assure that all the stannous chloride is utilized.

We claim:

1. The product obtained by the condensation at a temperature of about 50° C. of stannous chloride with about 0.5 to 10 moles, per mole of stannous chloride, of an alkylene oxide having 2–4 carbon atoms in the alkylene portion thereof and free of substituents other than halogen, phenyl, phenoxy, 2-chloroethoxy and allyloxy radicals.

2. The product defined in claim 1 wherein the alkylene oxide is propylene oxide.

3. The product defined in claim 1 wherein the alkylene oxide is styrene oxide.

4. The product obtained by condensing at a temperature of about 50° C. stannous chloride with about 0.5 to 10 moles, per mole of stannous chloride, of an alkylene oxide having 2–4 carbon atoms in the alkylene portion thereof and free of substituents other than halogen, phenyl, phenoxy, 2-chloroethoxy and allyloxy radicals and then partially hydrolyzing the thus formed condensate by contacting it with water.

5. The process for making a stannous chloride-alkylene oxide condensate comprising reacting by contacting stannous chloride with about 0.5 to 10 moles, per mole of stannous chloride, of an alkylene oxide having 2–4 carbon atoms in the alkylene portion thereof and free of substituents other than halogen, phenyl, phenoxy, 2-chloroethoxy and allyloxy radicals.

6. The process defined in claim 5 wherein the stannous chloride is dispersed in an inert fluid medium.

7. The process defined in claim 5 wherein the temperature is maintained at about 0–50° C.

8. The process defined in claim 5 wherein the alkylene oxide is propylene oxide.

9. The process defined in claim 5 wherein the alkylene oxide is styrene oxide.

10. The process for polymerizing an alkylene oxide having 2–4 carbon atoms in the alkylene portion thereof and free of substituents other than halogen, phenyl, phenoxy, 2-chloroethoxy and allyloxy radicals comprising heating the oxide at a polymerization temperature in the presence of a polymerization catalyst comprising the product formed by the condensation at a temperature of about 50° C. of stannous chloride with about 0.5 to 10 moles of an alkylene oxide having 2–4 carbon atoms in the alkylene portion thereof and free of substituents other than halogen, phenyl, phenoxy, 2-chloroethoxy and allyloxy radicals.

11. The process defined in claim 10 wherein the alkylene oxide to be polymerized is propylene oxide.

12. The process defined in claim 10 wherein the alkylene oxide to be polymerized is styrene oxide.

13. The process defined in claim 10 wherein the alkylene oxide to be polymerized is epichlorohydrin.

14. The process defined in claim 10 wherein the alkylene oxide to be polymerized is phenyl glycidyl ether.

15. The process defined in claim 10 wherein the alkylene oxide to be polymerized is allyl glycidyl ether.

16. The process defined in claim 10 wherein the temperature is about 60–100° C.

References Cited by the Examiner

UNITED STATES PATENTS

| | | | |
|---|---|---|---|
| 2,627,521 | 2/1953 | Coover | 260—348 |
| 2,706,181 | 4/1955 | Pruitt et al. | 260—2 |
| 2,730,532 | 1/1956 | Martin | 260—348 |
| 2,933,459 | 4/1960 | Gurgiolo | 260—2 |
| 2,989,510 | 6/1961 | Bruni | 260—67 |
| 3,117,099 | 1/1964 | Proops et al. | 260—18 |

OTHER REFERENCES

Worsfold et al., J.A.C.S., vol. 79 (Feb. 20, 1957), pp. 897–900.

Fiat Final Report 1311, Joint Intelligence Objectives Agency, Wash., D.C. (p. 55).

Furukawa et al., Polymerization of Aldehydes and Oxides, Interscience Publishers, 1963, pp. 147–155 and 242–245.

WILLIAM H. SHORT, *Primary Examiner.*

HAROLD N. BURSTEIN, *Examiner.*

UNITED STATES PATENT OFFICE
CERTIFICATE OF CORRECTION

Patent No. 3,248,347                                       April 26, 1966

Arthur E. Gurgiolo et al.

It is hereby certified that error appears in the above numbered patent requiring correction and that the said Letters Patent should read as corrected below.

Column 5, line 21, for "2.4" read -- 4 --; line 26, for "dioxane-water" read -- dioxane with warming --.

Signed and sealed this 5th day of November 1968.

(SEAL)
Attest:

Edward M. Fletcher, Jr.                              EDWARD J. BRENNER

Attesting Officer                                          Commissioner of Patents